(12) United States Patent
Jensen et al.

(10) Patent No.: US 9,285,803 B2
(45) Date of Patent: Mar. 15, 2016

(54) SCHEDULING FUNCTION IN A WIRELESS CONTROL DEVICE

(75) Inventors: Kurtis K. Jensen, Marshalltown, IA (US); Mitchell S. Panther, Marshalltown, IA (US); Tom W. Kirner, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 497 days.

(21) Appl. No.: 13/409,016

(22) Filed: Feb. 29, 2012

(65) Prior Publication Data
US 2013/0227575 A1 Aug. 29, 2013

(51) Int. Cl.
G06F 9/46 (2006.01)
G01N 19/00 (2006.01)
F16K 31/12 (2006.01)
G05B 23/02 (2006.01)
F16K 37/00 (2006.01)

(52) U.S. Cl.
CPC ........ G05B 23/0256 (2013.01); F16K 37/0075 (2013.01)

(58) Field of Classification Search
None
See application file for complete search history.

(56) References Cited

U.S. PATENT DOCUMENTS

| 7,504,961 B2 * | 3/2009 | Flanders ............ 340/679 |
| 2003/0062494 A1 * | 4/2003 | Snowbarger et al. ...... 251/89 |
| 2004/0199351 A1 * | 10/2004 | Ott et al. ............ 702/108 |
| 2008/0236679 A1 | 10/2008 | Esposito |
| 2009/0121868 A1 | 5/2009 | Flanders |

FOREIGN PATENT DOCUMENTS

WO    WO-99/21066 A1    4/1999

OTHER PUBLICATIONS

"Elektropneumatischer Stellungsregler SIPART PS2," (2006). Retrieved from the Internet on Apr. 25, 2013: URL:http://ge-gate.lngs.infn.it/cryo/~gerda/manuals/A5E00074630-06de_PS2_Handbuch.pdf.
"Fisher Fieldvue DVC6000 SIS DigitalValve Controllers for Safety InstrumentedSystem (SIS) Solutions," (2010). Retrieved from the Internet on Apr. 25, 2013: URL:http://www.documentation.emersonprocess.com/groups/public/documents/bulletins/dl02784x012.pdf.
International Search Report and Written Opinion for Application No. PCT/US2013/027920, dated May 6, 2013.
International Preliminary Report on Patentability for Application No. PCT/US2013/027920, dated Sep. 2, 2014.

* cited by examiner

*Primary Examiner* — Wissam Rashid
(74) *Attorney, Agent, or Firm* — Marshall, Gerstein & Borun LLP (57) ABSTRACT

A field device for use in a process control system includes a scheduling module configured to receive a time input which specifies a scheduled time for performing a scheduled action or a scheduled sequence of actions and to receive an action input which specifies the scheduled action or the scheduled sequence of actions. At the scheduled time, the scheduling module automatically initiates the scheduled action or the scheduled sequence of actions. After initiating the action or the sequence of actions, the scheduling module causes an initiation status indicating that the action or the sequence of actions has been initiated to be sent to a host and/or causes the initiation status to be stored in a local memory of the field device.

23 Claims, 4 Drawing Sheets

SCHEDULING FUNCTION IN A WIRELESS CONTROL DEVICE

FIELD OF THE INVENTION

The present invention relates generally to process plant safety systems and, more particularly, to scheduling actions in a field device.

DESCRIPTION OF THE RELATED ART

Process control systems, such as those used in chemical, petroleum and other processes, generally include one or more centralized or decentralized process controllers communicatively coupled to at least one host workstation, and to one or more process control and instrumentation devices, via analog, digital, or combined analog/digital buses. Field devices such as valves, valve positioners, switches, transmitters, and sensors (e.g., temperature, pressure, or flow rate sensors) perform various functions within the process, such as opening or closing valves or measuring process parameters. The process controller receives (via the communication buses) signals indicative of process measurements or process variables made by or associated with the field devices, implements a control routine based on the received information, and generates control signals which are sent over one or more of the buses to the field devices to control the operation of the process. Information from the field devices and the controller is typically made available to one or more applications executed by a host workstation to enable an operator to perform desired functions with respect to the process, such as viewing the current state of the process, modifying the operation of the process, etc.

"Smart" field devices that perform one or more process control functions have become prevalent in the process control industry. In addition to performing a primary function within the process (e.g., monitoring a temperature or controlling a valve position), each smart field device includes a memory and a microprocessor. The memory stores data pertaining to the device, and the microprocessor communicates with the controller and/or other devices, and/or performs secondary tasks such as self-calibration, identification, diagnostics, etc. A number of standard, open, digital or combined digital and analog communication protocols such as the Highway Addressable Remote Transducer (HART®), PROFIBUS®, FOUNDATION™ Fieldbus, WORLDFIP®, Device-Net®, and Controller Area Network (CAN) protocols have been developed to enable smart field devices made by different manufacturers to communicate with one another while performing one or more process control functions. In particular, wireless mesh networks such as WirelessHART® and International Society of Automation (ISA) 100.11a standard networks have become increasingly popular in process control.

During operation, a host typically sends a command to a field device in order to initiate an action (such as opening or closing a valve, for example) in the field device. To perform the action, the field device therefore needs to first receive and process a signal from the host. In wireless communication systems, upon receiving and properly decoding a signal, the field device typically transmits an "acknowledgement" back to the host informing the host that the signal has been properly received. Such communication exchanges between the field device and the host typically take place each time the device needs to perform an action. For example, if it is desired to open a valve and then close the valve after a certain period of time, the host would need to transmit a signal to a valve positioner to initiate the opening action, receive an acknowledgement from the valve positioner acknowledging that the signal to initiate the opening action has been properly received, transmit a signal to the valve positioner to initiate the closing action, and receive an acknowledgement from the valve positioner acknowledging that the signal to initiate the closing action has been properly received.

Due to inherent latency associated with typical communication systems (e.g., the amount of time it takes for a device to receive and process a signal from the host), communication exchanges that need to take place in order to control a device to perform an action limit how fast such actions can be performed by the device (e.g., when a number of actions need to be performed in quick succession). Communication latency issues are particularly important in wireless communication systems because it typically takes longer for a field device to receive and process a signal received via a wireless communication link compared to when a similar command is received via a wired connection. Further, field devices in a wireless process control system are typically powered by battery-based power modules in order to avoid restricting the placement of a device within a plant environment. It is therefore beneficial to limit communication exchanges between the field device and the host in a wireless control network so as to conserve power at the field device and thereby allow the device to be efficiently powered by a battery module for a longer period of time (e.g., several years).

SUMMARY

According to an embodiment, a field device for use in a process control system includes a processor and a computer readable memory having computer readable instructions executable on the processor. The field device also includes a scheduling module stored in the memory and configured to, when executed on the processor, receive a time input, wherein the time input specifies a scheduled time for performing a scheduled action or a scheduled sequence of actions and to receive an action input, wherein the action input specifies the scheduled action or the scheduled sequence of actions. The scheduling module is further configured to, at the scheduled time, automatically initiate the scheduled action or the scheduled sequence of actions. The scheduling module is still further configured to cause an initiation status to be sent to a first host communicatively coupled to the field device and/or cause the initiation status to be stored in a local memory of the field device. The initiation status indicates that the action or the sequence of actions has been initiated.

In accordance with one or more aspect, the scheduling module is further still configured to cause a completion status to be sent to the first host and/or cause the completion status to be stored in the local memory. In one aspect, the completion status indicates that the action or the sequence of actions has been completed. In another aspect, the completion status indicates one that the action or the sequence of actions has been completed successfully or that the action or the sequence of actions has been completed unsuccessfully. The scheduling module may be configured to determine the completion status based on feedback information received from the field device.

In accordance with an exemplary aspect, a user may provide the time input and the action input via a local user interface provided at the field device. In another exemplary aspect, a user may provide the time input and the action input via a host communicatively coupled to the field device. In one aspect, the host communicatively coupled to the field device is a portable communicator.

In one aspect, the field device is a valve positioner coupled to a valve, and the scheduled action corresponds to actuating the valve to a set point. In another aspect, the field device is a valve positioner coupled to a valve, and the scheduled sequence of actions corresponds to actuating the valve to a first set point and, after a specified period of time, actuating the valve to a second set point.

According to another embodiment, a field device for use in a process control system includes a processor and a computer readable memory having computer readable instructions executable on the processor. The field device also includes a scheduling module stored in the memory and configured to, when executed on the processor, receive an action input, wherein the action input specifies a scheduled action to be performed by the field device or a scheduled sequence of actions to be performed by the field device, and to receive an initiation instruction, wherein the initiation instruction indicates the scheduled action or the scheduled sequence of actions should be initiated. The scheduling module is further configured to, upon receiving the initiation instruction, initiate the scheduled action or the scheduled sequence of actions.

In accordance with an aspect, the scheduling module is further configured to cause an initiation status to be sent to a host communicatively coupled to the field device and/or cause the initiation status to be stored in a local memory of the field device. The initiation status indicates that the action or the sequence of actions has been initiated.

In accordance with some aspects, the scheduling module is further still configured to cause a completion status to be sent to a host communicatively coupled to the field device and cause the completion status to be stored in the local memory of the field device. In one aspect, the completion status indicates that the action or the sequence of actions has been completed. In another aspect the completion status indicates that the action or the sequence or actions has been completed successfully or that the action or the sequence of actions has been completed unsuccessfully.

According to yet another embodiment, a method for scheduling actions in a field device operating in a process control system includes electronically receiving, at the field device, a time input, wherein the time input specifies a scheduled time for performing a scheduled action or a scheduled sequence of actions. The method also includes electronically receiving, at the field device, an action input, wherein the action input specifies the scheduled action or the scheduled sequence of actions. The method further includes at the scheduled time, automatically initiating the scheduled action or scheduled sequence of actions; and performing at least one of: i) sending an initiation status to a host communicatively coupled to the field device and ii) storing the initiation status in a local memory of the field device. The initiation status indicates that the action or the sequence of actions has been initiated.

According to still another embodiment, a process control system comprises a field device and a host communicatively coupled to the field device. The field device includes a processor and a computer readable memory having computer readable instructions executable on the processor. The field device also includes a scheduling module stored in the memory and configured to, when executed on the processor, receive a time input, wherein the time input specifies a scheduled time for performing a scheduled action or a scheduled sequence of actions, and to receive an action input, wherein the action input specifies i) the scheduled action or ii) the scheduled sequence of actions. The scheduling module is further configured to, at the scheduled time, automatically initiate the scheduled action or the scheduled sequence of actions. The scheduling module is still further configured to cause an initiation status to be sent to a first host communicatively coupled to the field device and/or cause the initiation status to be stored in a local memory of the field device. The initiation status indicates that the action or the sequence of actions has been initiated.

DETAILED DESCRIPTION OF THE DRAWINGS

DETAILED DESCRIPTION

Figure 1:
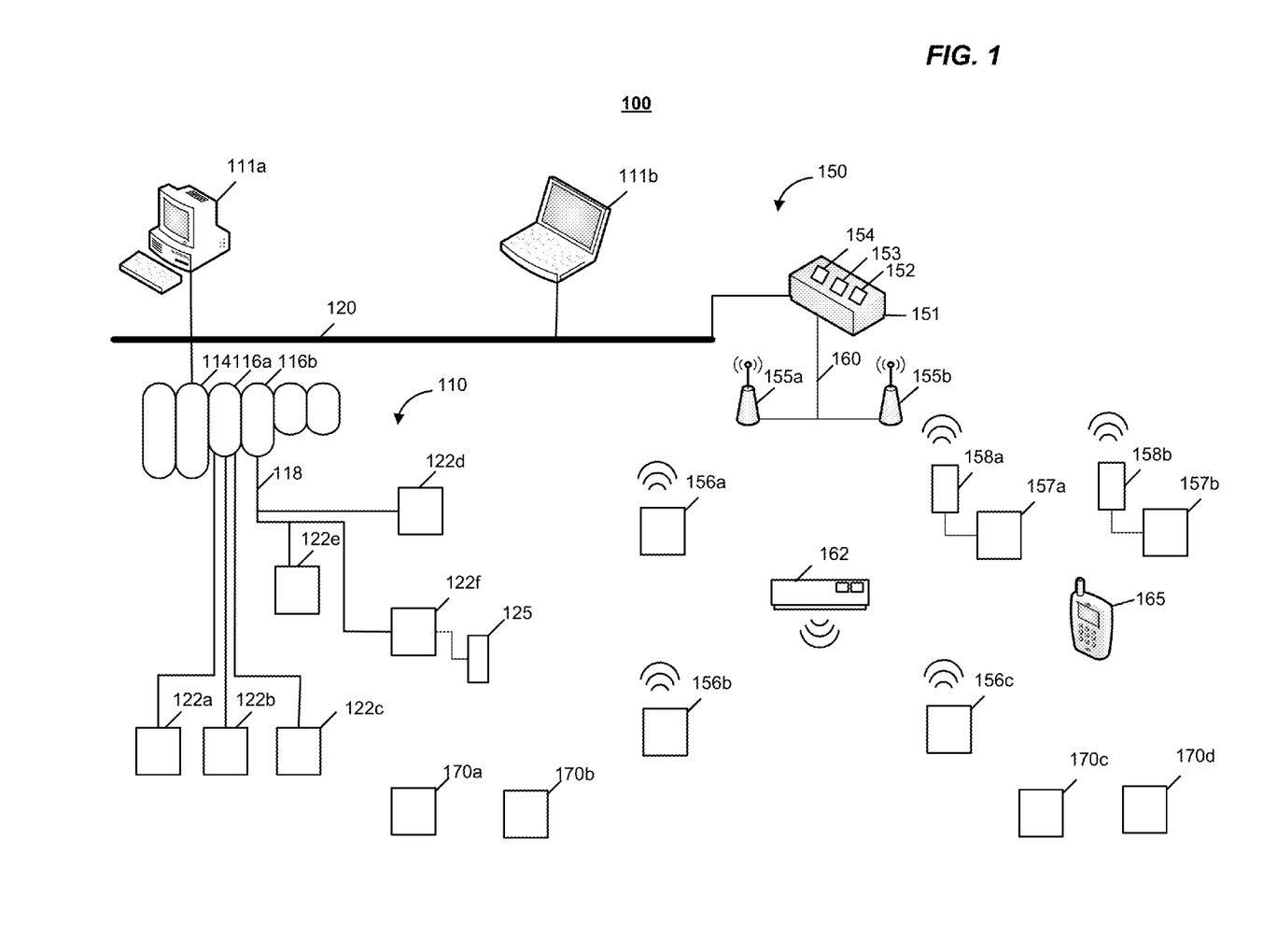
FIG. 1 illustrates a process control system incorporating field devices having scheduling capabilities in accordance with a disclosed example of the present invention.

FIG. 1 illustrates a process control system 100 incorporating field devices having scheduling capabilities in accordance with the present disclosure, according to an embodiment. The example process control system 100 includes a wired plant automation network 110 that operates according to an industrial automation protocol (e.g., HART, PROFIBUS DP (Decentralized Peripherals), etc.) or another suitable communication protocol, and a wireless plant automation network 150 that operates according to a suitable wireless communication protocol (e.g., WirelessHART, ISA100.11a, a Wi-Fi protocol, a wireless personal area network (WPAN) protocol, a proprietary wireless protocol, etc.), or another suitable wireless communication protocol. The wired plant automation network 110 includes one or more controllers 114 connected to one or more host workstations or computers 111 (which may be any type of personal computer or workstation) and connected to banks of input/output (I/O) devices 116 each of which, in turn, is connected to one or more field devices 122. The controllers 114, which may be, by way of example only, DeltaV™ controllers sold by Fisher-Rosemount Systems, Inc., are communicatively coupled to the host computers 111 via, for example, an Ethernet connection 120 or other communication link. Likewise, the controllers 114 are communicatively coupled to the field devices 122 using any suitable hardware and software associated with, for example, standard 4-20 ma devices and/or any smart communication protocol such as the Fieldbus or HART protocols. As is generally known, the controllers 114 implement or oversee process control routines stored therein or otherwise associated therewith and communicate with the devices 122 to control a process in any desired manner.

The field devices 122 may be any types of devices, such valves, valve positioners, switches, sensors (e.g., temperature, pressure, vibration, flow rate, or pH sensors), pumps, fans, etc., or combinations of two or more of such types, while the I/O cards within the card bank 116 may be any types of I/O devices conforming to any suitable communication or controller protocol such as HART, Fieldbus, Profibus, etc. Field devices 122 perform control, monitoring, and/or physical functions within a process or process control loop, such as opening or closing valves or taking measurements of process parameters, for example. In the embodiment illustrated in FIG. 1, the field devices 122a-122c are standard 4-20 ma devices that communicate over analog lines to the I/O card 116a. In another embodiment, the field devices 112a-122c are Hart devices and the I/O card 116a is a Hart compatible I/O card. In one embodiment, the control system 100 includes 4-20 ma devices as well as Hart devices. Accordingly, in this embodiment, the control system 100 includes one or more 4-20 ma compatible I/O cards as well as one or more Hart compatible I/O cards.

In the embodiment of FIG. 1, the field devices 122d-122f are smart devices, such as Fieldbus field devices, that communicate over the digital bus 118 to the I/O card 118 using, for example, Fieldbus protocol communications. Of course, the field devices 122 and the banks of I/O cards 116 could conform to any other suitable standard(s) or protocols besides the 4-20 ma, HART or Fieldbus protocols, including any standards or protocols developed in the future.

Each of the controllers 114 is configured to implement a control strategy using what are commonly referred to as function blocks, wherein each function block is a part (e.g., a subroutine) of an overall control routine and operates in conjunction with other function blocks (via communications called links) to implement process control loops within the process control system 100. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 100. Of course hybrid and other types of function blocks exist. Groups of these function blocks are called modules. Function blocks and modules may be stored in and executed by the controller 12, which is typically the case when these function blocks are used for, or are associated with standard 4-20 ma devices and some types of smartfield devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any suitable proprietary or non-proprietary programming language.

As discussed above, the process control system 100 also includes the wireless communication network 150 that utilizes or operates according to a suitable wireless communication protocol. For clarity, the discussion herein refers to the WirelessHART communication protocol, although the techniques and principles described herein may apply to wireless plant automation networks that utilize other wireless industrial automation protocols in addition to or instead of WirelessHART, or to networks that utilize only wired communications.

The wireless communication network 150 includes a gateway 151 connected to the communication backbone 120 in a wired manner and may communicate with the host stations 111 using a suitable protocol. The gateway 151 may be implemented as a stand-alone device, as a card that can be inserted into an expansion slot of one of the host workstations 111, as part of an input/output (I/O) subsystem of a programmable logic controller (PLC) system or distributed control system (DCS), or in any other manner. The gateway 151 may provide host stations 111, and applications executed thereon, access to various devices of the wireless plant automation network 150. In addition to protocol and command conversion, the gateway 151 may provide synchronized clocking that is used by time slots and superframes (i.e., sets of communication time slots that are spaced equally in time) of the scheduling scheme of the wireless plant automation network 150.

In some embodiments, the gateway 151 is functionally divided into a virtual gateway 152 and one or more network access points 155. In the process control system 100 shown in FIG. 1, the network access points 155 are separate physical devices in wired communication with the gateway 151. Alternatively, the elements 151, 152, 155 and 158 may instead be parts of an integral device, and/or the connections 158 may be wireless connections. Physically separate network access points 155 may be strategically placed in several distinct locations, thereby increasing the overall reliability of the communication network 100 by compensating for poor signal quality at the location of one or more of the network access points 155. Having multiple network access points 155 also provides redundancy in case of failure of one or more of the network access points 155.

The gateway device 151 may additionally contain a network manager software module 153 and a security manager software module 154. In another embodiment, the network manager software module 153 and/or the security manager software module 154 may run on a host workstation 111. For example, the network manager software module 153 may run on the stationary host workstation 111a and the security manager software module 154 may run on the portable host workstation 111b. The network manager software module 153 may be responsible for tasks such as configuration of the communication network 100, scheduling of communications between multiple WirelessHART devices (e.g., configuring superframes), management of routing tables, and monitoring and reporting of the health of the wireless plant automation network 150, for example. While redundant network manager software modules 153 may be supported, an example embodiment includes only one active network manager software module 153 per wireless plant automation network 150. The security manager software module 154 may be responsible for managing and distributing security encryption keys, and may maintain a list of devices that are authorized to join the wireless plant automation network 150 and/or the wired plant automation network 110, for example.

The wireless plant automation network 150 also includes one or more field devices 156, 157, each of which is in some manner equipped for wireless communication with other devices 156, 157, a host station, a portable device, etc. Each of the field devices 156, 157 may be, for example, a valve, a valve positioner, a switch, a sensor (e.g., temperature, pressure, vibration, flow rate, or pH sensor), a pump, a fan, etc., or a combination of two or more such devices. Field devices 156, 157 perform control, monitoring, and/or physical functions within a process or process control loop, such as opening or closing valves or taking measurements of process parameters, for example. In the example wireless plant automation network 150, the field devices 156, 157 are also producers and consumers of wireless communication packets, such as WirelessHART packets. Some or all of the field devices 156, 157 may additionally serve as routers for messages from and to other devices.

The field devices 156 may be WirelessHART devices, meaning that each of field devices 156 is provided as an integral unit supporting all layers of the WirelessHART protocol stack. For example, the field device 156a may be a WirelessHART flow meter, the field devices 156b may be WirelessHART pressure sensors, the field device 156c may be a WirelessHART valve positioner, and the field device 156d may be a WirelessHART vibration sensor. The field device 157a may be a legacy 4-20 mA device, and the field device 157b may be a wired HART device. In the example process control system 100 shown in FIG. 1, each of field devices 157 is connected to the wireless plant automation network 150 via a WirelessHART adaptor (WHA) 158. Each WHA 158 may also support other communication protocols such as FOUNDATION Fieldbus, PROFIBUS, DeviceNet, etc., in which case the WHA 158 supports protocol translation on a lower layer of the protocol stack. A single WHA 158 may additionally function as a multiplexer and support multiple HART or non-HART devices.

Plant personnel may use handheld or portable communication devices, instead of or in addition to a host station, for setup, installation, control, monitoring, and/or maintenance of network devices and other plant equipment. Generally speaking, a portable communication device ("portable communicator") is a portable piece of equipment that can connect directly to a field device 122, 156, 158 via a wireless or a wired connection, or may connect directly to the wireless plant automation network 150, or connect to the wireless plant automation network 150 through the gateway 151. In the example process control system 100 shown in FIG. 1, a portable communicator 125 communicates directly with the field device 122f via a wired connection, and a portable communicator 165 communicates directly with the wireless plant automation network 150. When operating with a formed wireless plant automation network 150, the portable communicator 165 may join the wireless plant automation network 150 as another WirelessHART field device, for example. When operating with a target network device that is not connected to a WirelessHART network, the portable communicator 165 may operate as a combination of the gateway device 151 and the network manager software module 153 by forming its own WirelessHART network with the target network device. Further, in some embodiments, a field device 122, which is generally a part of the wired automation network 110, may be adapted for wireless communication with a portable communicator (e.g., the portable communicator 165) via a wireless adapter. In general, the term "host" as used herein may refer to any stationary or portable device such as, for example a workstation used for monitoring and controlling field devices, a monitoring station, a portable communicator, that communicates with a field device in any manner using a wireless or a wired connection, or a group of such devices combined in a communication network that is used for communicating with field devices.

Referring again to FIG. 1, the wireless plant automation network 150 of the example process control system 100 also includes a router device 162. The router device 162 is a network device that forwards packets from one network device to another. A network device that is acting as a router uses internal routing tables to determine another network device to which the routing network device should forward a particular packet. Stand-alone routers such as the router 162 may not be required where other devices on the wireless plant automation network 150 support routing. However, it may be beneficial to add the dedicated router 162 to the wireless plant automation network 150 in order to extend the network, for example, or to save the power of field devices in the network.

All devices directly connected to the wireless plant automation network 150 may be referred to as network devices of the wireless plant automation network 150. In particular, the WirelessHART field devices 156, 157, the WHAs 158, the routers 162, the gateway 151, the network access points 155, and the handheld device 165 may, for the purposes of routing and scheduling, be referred to as the network devices of the wireless plant automation network 150. In order to provide a very robust and an easily expandable network, all network devices may support routing and each network device may be globally identified by its HART address. Moreover, the network manager software module 153 may contain a complete list of network devices and assign each device a network-unique name (e.g., a 16-bit name). Further, each network device may store information related to update rates, connection sessions, and device resources. In short, each network device may maintain up-to-date information related to routing and scheduling. In some embodiments, the network manager software module 153 communicates this information to network devices whenever new devices (e.g., new field devices) join the network or whenever the network manager detects or originates a change in topology or scheduling of the wireless plant automation network 150.

In addition to generating, receiving, and/or forwarding data relating to the primary operations of the process control system 100 (e.g., temperature sensor data, data for controlling valve positions, etc.), the devices of the process control system 100 may communicate data relating to maintenance of devices in the process control system 150. For example, a field device may send data to a host when the field device is operating improperly (e.g., when a spool valve of a valve positioner is inoperable), or is at risk of improper operation (e.g., when a voltage of a power module of the device falls below a certain level). As another example, a field device may continuously or periodically send to a host certain data relating to proper operation (e.g., data indicating that certain action or actions have been successfully performed by a field device). The host receiving such data (e.g., the host workstation 111) may display indicators based on that data via a graphical user interface (GUI), thereby allowing a human operator to take the appropriate corrective or preventive measures, or may utilize such data in keeping historical records of equipment and/or processes operation within the process control system 100.

Although FIG. 1 depicts the communication network 100 as including both a wired plant automation network 110 and a wireless plant automation network 150, the communication network 100 may instead include only the wired plant automation network 110 or only the wireless plant automation network 150. In one embodiment, the wireless plant automation network 150 is a wireless mesh communication network.

Additionally, the process control system 100 may include one or more field devices 170 implemented as stand-alone devices. As such, the field devices 170 are essentially separate from the host stations 111 in that a field device 170 can only be controlled or monitored by control system personnel at the site of the field device 170. To this end, the field device 170 may provide a user interface (at the field device) that allows a device operator to locally control the device. Alternatively or additionally, a field device 170 may be equipped to be locally controlled via a portable communicator (e.g., the portable communicator 165 or the portable communicator 125) which may connect to the field device 170 physically via a wired connection or via a wireless communication link. In some embodiments, stand-alone field devices, such as field devices 170, operate in plant environments that do not utilize a process control system, or in situations in which a host control system is unavailable or is not configured to communicate with the field device 170, for example if the field device 170 is in a remote location not reachable by the host system.

Figure 2:
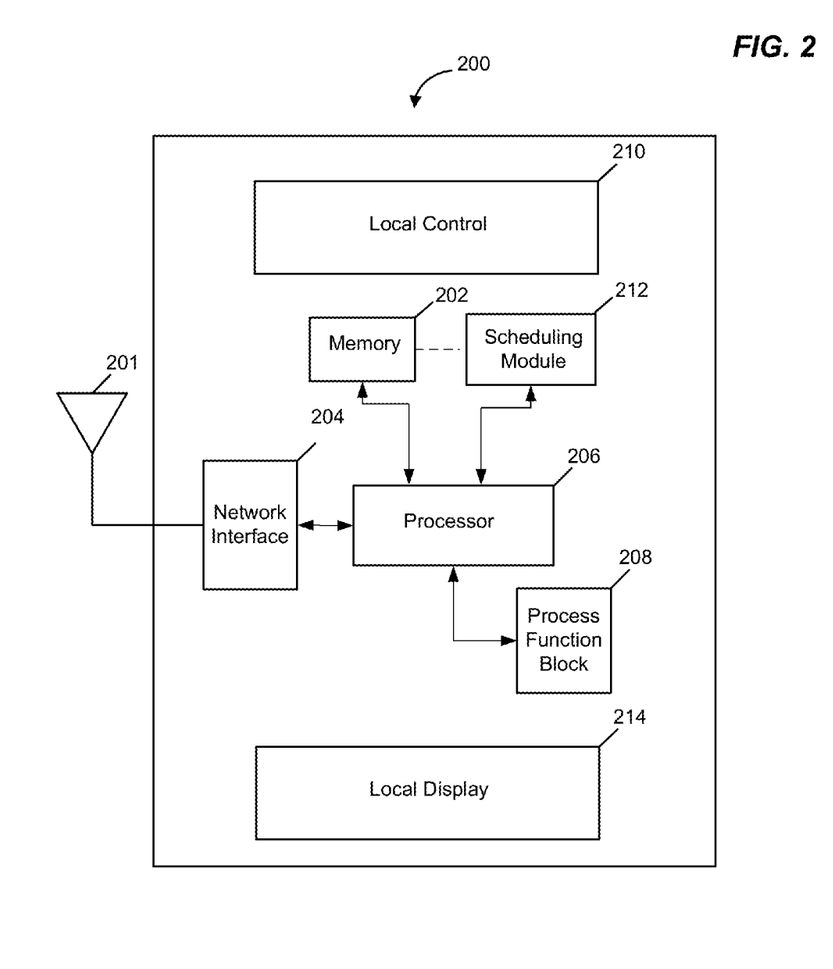
FIG. 2 is a block diagram of an example field device, assembled in accordance with the disclosed example, and which includes a local scheduling module that a host control system may utilize to automatically control and/or monitor the field device.

FIG. 2 is a block diagram of an example field device 200 which includes a scheduling module 212 that a host control system may utilize to automatically control and/or monitor the field device 200 in accordance with an example embodiment of the present invention. The field device 200 may be incorporated within a process control system such as the example process control system 100 of FIG. 1. With reference to FIG. 1, according to an embodiment, the field device 200 is one of the field devices 156, 157 which communicate with a host station 111 using a wireless communication link. With continued reference to FIG. 1, in some embodiments, a field device similar to the field device 200 may be one of the field devices 122 which communicates with a host station 111 using a wired communication link. Further, in some embodiments, the field device 200 is a stand-alone field device which can be controlled and/or monitored locally using a local user interface at the field device or via a portable communicator such as the portable communicator 165 or the portable communicator 125 of FIG. 1, for example. In some such embodiments, the antenna and/or the network interface of the field device 200 may be omitted.

The field device 200 includes a network interface 204 configured to transmit and/or receive signals according to a particular communication protocol of the process control system of which the field device is a part. In some embodiments, the communication protocol is a wireless mesh network protocol, such as the WirelessHART or ISA 100.11a protocol, or a communication protocol suitable for wired operation, such as HART or PROFIBUS, for example. In some embodiments, the network interface 204 includes a transceiver (not shown). The transceiver typically includes one or more processors (also not shown) for executing instructions relating to physical (PHY) layer and other layer (e.g., medium access control (MAC) layer) tasks according to the wireless communication protocol utilized by the process control system. The network interface may be coupled to an antenna 201 or, alternatively, to multiple antennas. Via the antenna 201, the network interface 204 transmits and/or receives data packets according to the wireless communication protocol. In embodiments in which the network interface 204 is configured for wired communication, the antenna 201 may be omitted. The network interface 204 is preferably configured to both transmit and receive data packets.

The network interface 204 of the example field device 200 is communicatively coupled to a processor 206, which is in turn communicatively coupled to a computer readable memory 202 and a process function block 208. The process function block 208 performs the primary function of the field device 200 (e.g., measurement and/or control of fluid level, flow rate, pH level, vibration, etc.) within the process control system. For example, where the field device 200 is a valve positioning device, the process function block 208 may include a spool valve that controls air pressure output to a valve according to control signals from the processor 106. As another example, where the field device 200 is a temperature sensing device, the process function block 208 may include one or more temperature sensors, and one or more transducers for converting the sensor signals to digital signals that are sent to the processor 206.

The memory 202 may store process-related variables (e.g., past sensor measurement values that the processor 206 received from the process function block 208, future control values that the processor 206 received from a network via the network interface 204, etc.), and/or may store routing and/or scheduling data pertaining to a network (e.g., the wireless plant automation network 150 of FIG. 1), for example. While the example field device 200 of FIG. 2 includes one processor 206, other embodiments may include two or more processors that perform the functions of the processor 206. Alternatively, the field device 200 may include a single processor that performs not only the functions of the processor 206, but also any processing required by the network interface 204. Moreover, any additional processing required by the process function block 208 may be performed by the processor 206, or by one or more separate processors.

The field device 200 may be configurable to perform certain actions automatically, for example at predetermined times and/or at predetermined time intervals, or to perform certain preconfigured (scheduled) actions upon receiving an from a user or from a host communicatively coupled to the field device 200. To this end, the field device 200 includes a scheduling module 212 communicatively coupled to the processor 206. The scheduling module 212 may be stored in the memory 202 or may be stored in another memory in the field device 200, for example. In some embodiments, the scheduling module 212 may be provided as a separate chip. In this case, the scheduling module 212 may be connected directly to the function block 208. As will be explained in more detail with reference to FIGS. 3 and 4, the scheduling module 212 may be configurable by a user and may be used, when executed on the processor 206 (or on another processor on the field device 200) to control the field device to perform a scheduled action or a scheduled sequence of actions at a scheduled time automatically, without any further input, or, alternatively, upon receiving an instruction to initiate ("initiation command") the action or the sequence of actions.

As an example, in an embodiment in which the field device 200 is a valve positioning device, the scheduling module 212 may be configured to actuate a valve from an open position to a closed position, or, more generally, from one set point to another set point (e.g., 25%, 50%, 75%, 100%, or any other suitable value) at a scheduled time and/or at scheduled time intervals (e.g., at 10 μm, or at 10 μm every day), or upon receiving an initiation command from a user or a host instructing the scheduling module 212 to initiate the action. As another example, the scheduling module 212 may be configured to initiate a sequence of actions, which may include for example, an action of opening a valve to a certain position (e.g., 25%, 50%, 75%, 100%, or to any other suitable set point), and an action of closing the valve after a certain period of time, e.g., after 1, 2, 3, 4, 5, etc. seconds or after any other suitable period of time. In one such embodiment, a user may input a scheduled time at which the sequence of actions is to be initiated. In this case, the scheduling module 212 will control the field device to initiate the sequence of actions at the scheduled time. Alternatively, the scheduling module 212 may be configured to initiate the scheduled sequence of actions upon receiving an instruction to initiate the sequence from a user (e.g., device operator) or from a host station, for example. In this case, the host needs to send only one command to cause the field device 200 to perform the scheduled actions, rather than sending a separate command to initiate each action in the sequence. Thus, use of the scheduling module 212 may conserve energy used by the device and may allow the device to perform the scheduled actions with consistency, at the expected time, and in quick succession, which may not be possible if a separate command for each action needs to be transmitted by the host system because of latency constraints of the communication link (i.e., the time needed to receive and process communication signals).

In some embodiments, the scheduling module 212 is configured to, upon initiating a scheduled action (or a sequence of scheduled actions), send an initiation status to a host informing the host that the action (or the sequence of actions) has been initiated. Additionally or alternatively, after the scheduled action (or—sequence of actions) has been completed, the scheduling module 212 may send the host a completion status indicating that the action (or sequence of actions) has been completed. The scheduling module 212 may also send to a host a completion status indicating that the action (or sequence of actions) has been completed successfully. Further, if the action (or actions) were not completed successfully, the scheduling module 212 may communicate to the host that the field device 200 was not able to properly perform the action (or actions). The host may store such information received from the field device 200 to log historical data associated with operation of the field device, for example In some embodiments, the scheduling module 212 may be configured to provide a host with additional diagnostic information or other data related to the scheduled actions. For example, the scheduling module 212 may cause an alert signal to be sent to the host if a scheduled action (or actions) has not completed as expected. For example, the scheduling module 212 may be provided with information regarding the expected duration of a scheduled action, and the scheduling module 212 may alert the host system when the scheduled action is completed too quickly or too slowly.

In some embodiments, in addition to or instead of sending data related to initiation, completion and/or expected performance of scheduled action or actions, the scheduling module 212 may cause such data to be stored locally, for example, in the memory 202 or in another local memory of the field device 200. The stored data may then be available for later retrieval by the host system (e.g., by a host station, by a portable or handheld device, etc.), for example.

In various embodiments and/or scenarios, the scheduling module 212 may be configurable by a user (e.g., a device operator) in a variety of ways. For example, the example field device 200 may include a local control block 210, and a device operator may configure the scheduling module 212 using the local controls. To this end, in some embodiments, the local control 210 includes a touch screen, a set of buttons, etc. Alternatively, a device operator may configure the scheduling module 212 using a stationary or a portable host, such as the portable communicator 122 or the portable communicator 165 of FIG. 1. A wireless portable communicator may connect wirelessly to the field device 200 via the antenna 201 and the network interface 204, for example. In this case, the portable communicator may use any suitable communication protocol to communicate with the field device 200. For example, in one embodiment, the network interface 204 may be configured to operate according to a Bluetooth communication protocol, and the portable communicator may be used to configure the scheduling module 212 using the Bluetooth protocol. Alternatively, a portable communicator may physically connect to the field device 200 via a wired connection. As yet another example, the scheduling module 212 may be configured using a host station, such as a host station 111 of FIG. 1, or any other suitable host communicatively coupled to the field device 200.

In an embodiment, the field device 200 also includes a local display 214 for displaying certain parameters associated with the operation of the field device 200. For example, the local display 214 may display the current position of a valve in a case that the field device 200 is a valve positioner, or a measured temperature if the field device 200 is a temperature sensor. Additionally, the local display 214 may display certain calibration information associated with the field device 200. In some embodiments, the local display 214 may also be used to display information related to the scheduling module 212. For example, the local display 214 may display that a scheduled action (or sequence of actions) has been initiated and/or whether a scheduled action (or sequence of actions) has been successfully completed (or has not been successfully completed).

In some embodiments, for example if the field device 200 is connected to a host system using a wired communication link, or if the field device 200 is a stand-alone field device not connected to a host system, the antenna 201 and/or the network interface 204 may be omitted from the field device 200.

Figure 3:
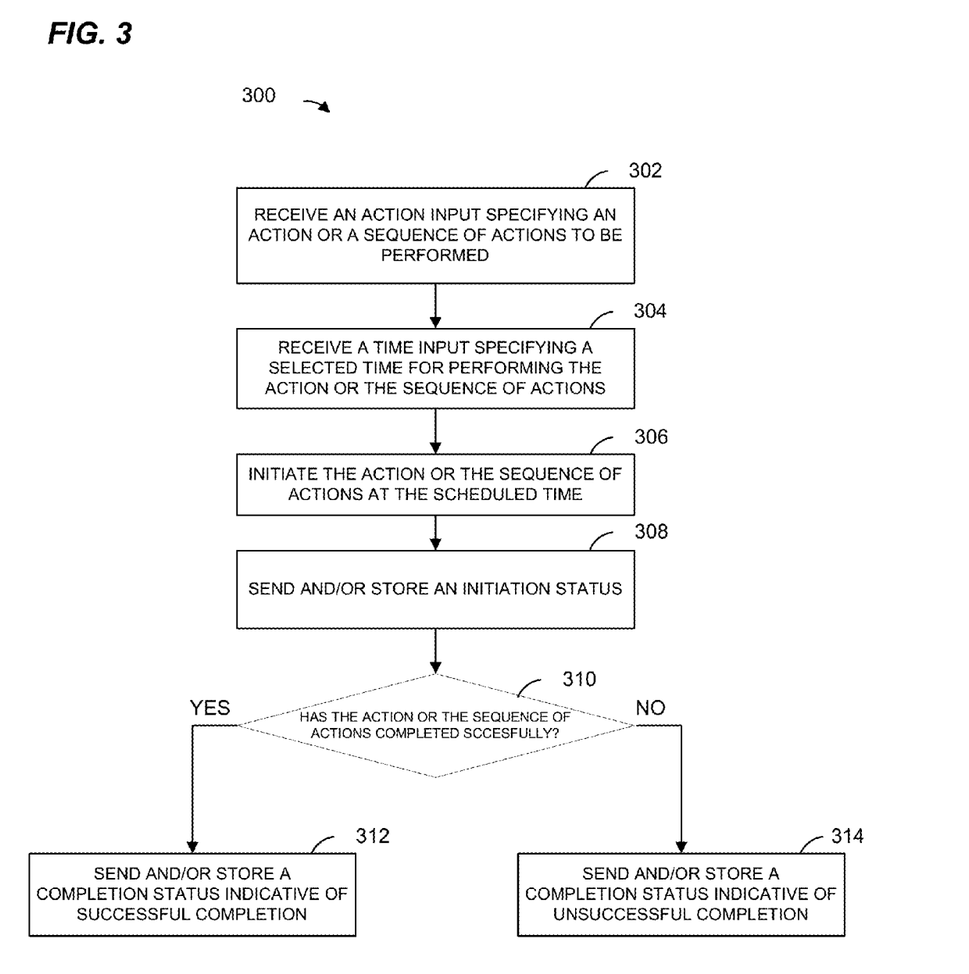
FIG. 3 is an example flow chart of an exemplary method for scheduling actions to be automatically performed by the field device at a scheduled time and/or at scheduled time intervals.

FIG. 3 is an example flow chart of an exemplary method 300 for scheduling actions to be automatically performed by a field device at a scheduled time and/or at scheduled time intervals. In an embodiment, the method 300 is implemented by the scheduling module 212 and executed on the processor 206 in the field device 200 of FIG. 2. In another embodiment, the method 300 is implemented in another suitable scheduling module and/or is used in another suitable field device. For clarity, the method 300 is described below as being performed by the scheduling module 212 in the field device 200 of FIG. 2.

At block 302, the scheduling module 212 receives an input specifying a scheduled action or a scheduled sequence of actions ("action input") to be performed by the field device 200. In an example embodiment in which the field device 200 is a valve, the scheduled action may correspond to actuating the valve to open to a predetermined set point, for example. Similarly, in another embodiment or scenario, the scheduled sequence of actions may correspond to actuating a valve to open to a predetermined set point, and actuating the valve to close or to move to a different set point after a specified period of time (e.g., 5 seconds).

At block 304, the scheduling module 200 receives an input specifying a scheduled time ("time input") at which the action (or the sequence of actions) is to be initiated. In some embodiments, the input specifying the scheduled time also specifies a time interval with which the action (or the sequence of actions) is to be periodically performed. In this case, the scheduling module 212 may initiate the scheduled action (or sequence of actions) periodically, at the specified time intervals.

At block 306, at the scheduled time received at block 304, the scheduling module 212 initiates the action (or sequence of actions) received at block 302. In embodiments and/or situations in which the input received at block 304 includes a time interval for periodically performing the action (or sequence of actions), the scheduling module also initiates the action (or the sequence of actions) at the time intervals specified at block 304. At block 308, the scheduling module 212 causes an "initiation status" indicating that the action or the sequence has been initiated to be sent to a host communicatively coupled to the field device 200. Additionally or alternatively, the scheduling module 212 causes, at block 308, the initiation status to be locally stored in a memory of the field device 200.

At block 310, the scheduling module 212 checks whether the action (or sequence of actions) was successfully completed. For instance, the scheduling module 212 may receive feedback information in regard to the initiated action or actions (e.g., valve position feedback from a valve position transmitter coupled to a valve). The scheduling module 212 may then compare the received feedback data to the specified action parameter (or parameters) received at block 304, and determine that the action (or actions) were successfully completed if the received feedback corresponds to the specified parameter (or parameters). On the other hand, if the received feedback does not correspond to the specified parameter (or parameters) received at block 304, the scheduling module 212 may determine at block 310 that the action (or actions) were completed unsuccessfully.

If it is determined at block 310 that the action (or sequence of actions) has been completed successfully, the method 300 continues at block 312 at which the scheduling module 212 causes a "completion status" indicative of successful completion to be sent to the host and/or may cause the completion status indicative of successful completion to be stored in a local memory of the field device 200. On the other hand, if it is determined at block 308 that the action or sequence of actions have not been successfully completed, the method 300 continues at block 314 at which the scheduling module 212 causes a completion status signal indicative of unsuccessful completion of the scheduled action (or sequence of actions) to be sent to the host and/or to be locally stored in the field device 200.

Further, in some embodiments, if the scheduling module 212 is provided with additional information in regard to the expected performance (e.g., expected duration) of the action (or actions), the scheduling module 212 may check at block 310 whether the action (or actions) were completed as expected, and may alarm the host if it is determined that the action (or actions) were performed not as expected (e.g., too quickly or too slowly), or may cause an indication of unexpected performance to be locally stored in a memory of the field device 200.

In some embodiments blocks 308-312 may be omitted.

Figure 4:
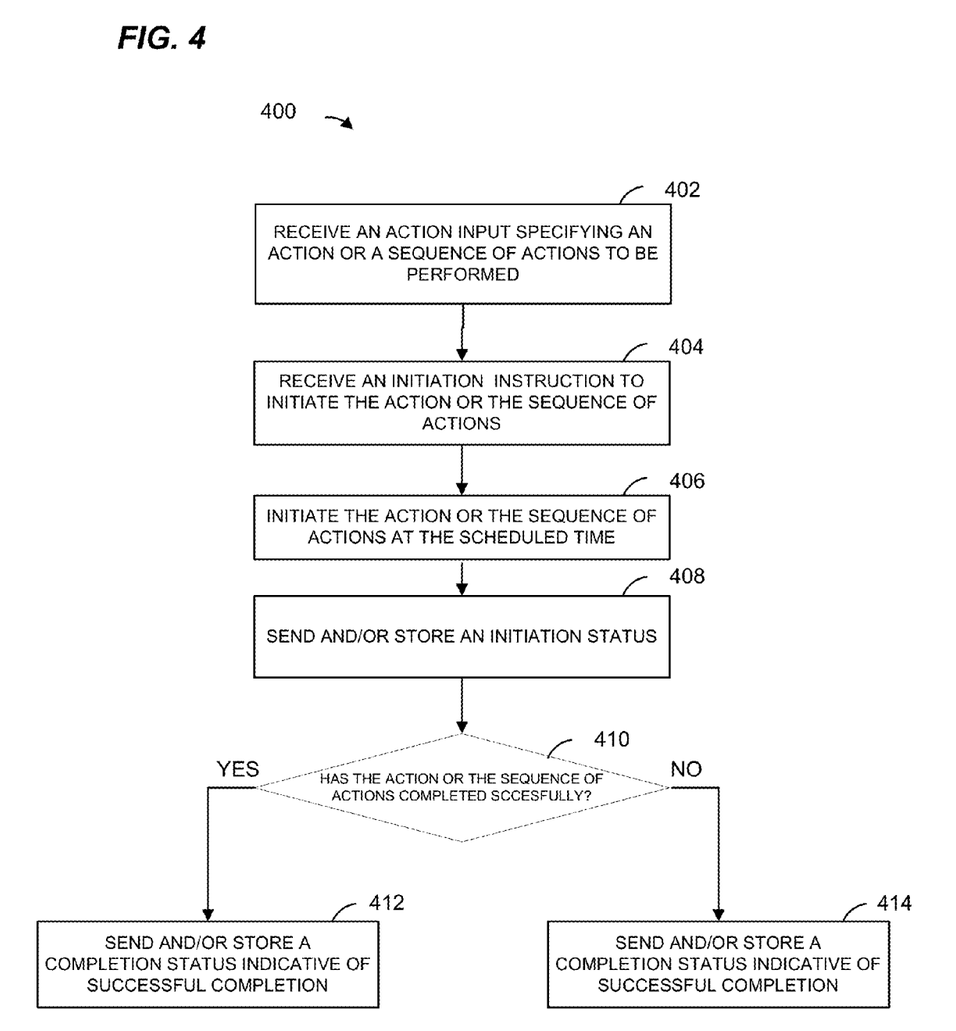
FIG. 4 is an example flow chart of an exemplary method for scheduling actions to be performed by a field device upon receiving an instruction to initiate the actions.

FIG. 4 is an example flow chart of an exemplary method 400 for scheduling actions to be performed by a field device upon receiving an instruction to initiate the actions, according to an embodiment. In an embodiment, the scheduling method 400 is implemented by the scheduling module 212 and executed on the processor 206 in the field device 200 of FIG. 2. In another embodiment, the method 400 is implemented in another suitable scheduling module and/or is used in another suitable field device. For clarity, the method 400 is described below as being performed by the scheduling module 212 in the field device 200 of FIG. 2.

At block 402, the scheduling module 212 receives an input specifying a scheduled action or a scheduled sequence of actions ("action input") to be performed by the field device 200. In an example embodiment in which the field device 200 is a valve, the scheduled action may correspond to actuating the valve to open to a predetermined set point, for example. Similarly, in another embodiment or scenario, the scheduled sequence of actions may correspond to actuating a valve to open to a predetermined set point, and actuating the valve to close or to move to a different set point after a specified period of time (e.g., 5 seconds).

At block 404, the scheduling module 200 receives an "initiation instruction" instructing the scheduling module 212 to initiate the scheduled action (or the sequence of actions) received at block 402. At block 406, the scheduling module 212 initiates the action or the sequence of actions. At block 408, the scheduling module 212 causes an initiation status indicating that the action or the sequence has been initiated to be sent to a host communicatively coupled to the field device 200. Additionally or alternatively, the scheduling module 212 causes, at block 408, the initiation status to be locally stored in a memory of the field device 200.

At block 410, the scheduling module 212 checks, e.g., using feedback information as discussed above with respect to block 310 of FIG. 3, whether the action (or sequence of actions) was successfully completed. If it is determined at block 408 that the action (or sequence of actions) has been completed successfully, the method 400 continues at block 410 at which the scheduling module 212 causes a completion status indicative of successful completion to be sent to a host and/or may store the completion status indicative of successful completion in a local memory of the field device 200. On the other hand, if it is determined at block 408 that the action or sequence of actions have not been successfully completed, the method 400 continues at block 412 at which the scheduling module 212 causes an action status signal indicative of unsuccessful completion of the scheduled action (or sequence of actions) to be sent to the host and/or to be locally stored in the field device 200.

Further, in embodiments in which the scheduling module 212 is provided with additional information in regard to the expected performance of the action (or actions), block 410 may also check whether the action (or actions) were completed as expected and alarm the system if it is determined that the action (or actions) were performed not as expected (e.g., too quickly or too slowly), the scheduling module 212 may alarm the host system (e.g., a host station, a portable device, etc.) of unexpected performance, or may store an indication of unexpected performance in local memory of the field device 200.

In some embodiments blocks 408-414 may be omitted.

While various functions and/or systems of field devices have been described herein as "modules," "components," or "function blocks," it is noted that these terms are not limited to single, integrated units. Moreover, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

The invention claimed is:

1. A field device for use in a process control system, the field device comprising:

a processor;

a non-transitory computer readable memory having computer readable instructions executable on the processor;

at least one function block stored in the non-transitory computer readable memory that, when executed on the processor, causes the processor to initiate i) a scheduled action or ii) a scheduled sequence of actions, to be performed by the field device, wherein the field device is a valve positioner coupled to a valve, wherein the scheduled action include at least one communication function that causes the field device to communicate process control data from at least one second field device and that causes the field device to communicate process control data to at least one third field device and the scheduled sequence of actions includes actuating the valve to a first set point and, after a specified period of time, actuating the valve to a second set point; and a scheduling module stored in the non-transitory computer readable memory, the scheduling module, when executed on the processor, configured to:

receive a time input from a host device, wherein the host device is a portable communicator that is communicatively coupled to the field device via a wireless communication network, wherein the time input specifies a scheduled tine for performing i) the scheduled action or ii) the scheduled sequence of actions;

receive an action input from the host device via the wireless communication network, wherein the action input specifies i) the scheduled action or ii) the scheduled sequence of actions;

at the scheduled time and without further communication from the host device, automatically causes the processor to execute the at least one function block to initiate i) the scheduled action or ii) the scheduled sequence of actions; and perform at least one of: i) cause an initiation status to be sent to the host device and ii) cause the initiation status to be stored in a local memory of the field device;

wherein the initiation status indicates that the action or the sequence of actions has been initiated.

2. The field device of claim 1, wherein the scheduling module is further configured to perform at least one of one of: i) cause a completion status to be sent to the host device and ii) cause the completion status to be stored in the local memory.

3. The field device of claim 2, wherein the completion status indicates that the action or the sequence of actions has been completed.

4. The field device of claim 2, wherein the completion status indicates one of: i) that the action or the sequence of actions has been completed successfully or ii) that the action or the sequence of actions has been completed unsuccessfully.

5. The field device of claim 2, wherein the scheduling module is configured to determine the completion status based on feedback information received from the field device.

6. The field device of claim 1, wherein the field device is a valve positioner coupled to a valve, and wherein the scheduled action further corresponds to actuating the valve to a set point.

7. A field device for use in a process control system, the field device comprising:

a processor;

a non-transitory computer readable memory having computer readable instructions executable on the processor;

at least one function block stored in the non-transitory computer readable memory that, when executed on the processor, causes the processor to initiate i) a scheduled action or ii) a scheduled sequence of actions, to be performed by the field device, wherein the field device is a valve positioner coupled to a valve, wherein the scheduled action include at least one communication function that causes the field device to communicate process control data from at least one second field device and that causes the field device to communicate process control data to at least one third field device and the scheduled sequence of actions includes actuating the valve to a first set point and, after a specified period of time, actuating the valve to a second set point; and a scheduling module stored in the non-transitory computer readable memory, the scheduling module, when executed on the processor, configured to:

receive an action input via a host, wherein the host is a portable communicator communicatively coupled via a wireless communication network to the field device, wherein the action input specifies i) the scheduled action to be performed by the field device or ii) the scheduled sequence of actions to be performed by the field device; and receive an initiation instruction without further communication external of the field device, wherein the initiation instruction causes the processor to execute the at least one function block and indicates the scheduled action or the scheduled sequence of actions should be initiated; and upon receiving the initiation instruction, initiate the scheduled action or the scheduled sequence of actions.

8. The field device of claim 7, wherein the scheduling module is configured to receive the action input via a local user interface provided at the field device.

9. The field device of claim 7, wherein the field device is a valve positioner coupled to a valve, and wherein the scheduled action further corresponds to actuating the valve to a set point.

10. The field device of claim 7, wherein the scheduling module is further configured to perform at least one of: i) cause an initiation status to be sent to a host communicatively coupled to the field device and ii) cause the initiation status to be stored in a local memory of the field device; and wherein the initiation status indicates that the action or the sequence of actions has been initiated.

11. The field device of claim 10, wherein the scheduling module is further configured to perform at least one of: i) cause a completion status to be sent to a host communicatively coupled to the field device and ii) cause the completion status to be stored in the local memory of the field device.

12. The field device of claim 11, wherein the completion status indicates that the action or the sequence of actions has been completed.

13. The field device of claim 11, wherein the completion status indicates one of: i) that the action or the sequence or actions has been completed successfully or ii) that the action or the sequence of actions has been completed unsuccessfully.

14. The field device of claim 11, wherein the scheduling module is configured to determine the completion status based on feedback information received from the field device.

15. A method for scheduling actions in a field device operating in a process control system, the method comprising:

electronically receiving, at the field device, a function block, wherein the field device is a valve positioner coupled to a valve and wherein the field device implements the function block to perform a scheduled action or a scheduled sequence of actions to be performed by the field device, wherein the scheduled action include at least one communication function that causes the field device to communicate process control data from at least one second field device and that causes the field device to communicate process control data to at least one third field device and the scheduled sequence of actions includes actuating the valve to a first set point and, after a specified period of time, actuating the valve to a second set point;

electronically receiving, at the field device, a time input from a host device, wherein the host device is a portable communicator that is communicatively coupled to the field device via a wireless communication network, wherein the time input specifies a scheduled time for performing the scheduled action or the scheduled sequence of actions;

electronically receiving, at the field device, an action input from the host device, via the communication network, wherein the action input specifies the scheduled action or the scheduled sequence of actions;

at the scheduled time and without further communication external of the field device, automatically causing the field device to implement the at least one function block to initiate the scheduled action or scheduled sequence of actions; and performing at least one of: i) sending an initiation status to the host communicatively coupled to the field device and. ii) storing the initiation status in a local memory of the field device; and wherein the initiation status indicates that the action or the sequence of actions has been initiated.

16. A method according to claim 15, further comprising performing at least one of: i) sending a completion status to the host and ii) storing the completion status in the local memory.

17. A method according to claim 16, wherein the completion status indicates that the action or the sequence of actions has been completed.

18. A method according to claim 16, wherein the completion status indicates one of: i) that the action or the sequence or actions has been completed successfully or ii) that the action or the sequence of actions has been completed unsuccessfully.

19. A method according to claim 16, wherein the scheduling module is configured to determine the completion status based on feedback information received from the field device.

20. A process control system comprising:
a field device; and
a host communicatively coupled to the field device; and
wherein the field device comprises: a processor;
    a non-transitory computer readable memory having computer readable instructions executable on the processor;
    at least one function block stored in the non-transitory computer readable memory that, when executed on the processor, causes the processor to initiate i) a scheduled action or ii) a scheduled sequence of actions, to be performed by the field device, wherein the field device is a valve positioner coupled to a valve and wherein the scheduled action include at least one communication function that causes the field device to communicate process control data from at least one second field device and that causes the field device to communicate process control data to at least one third field device and the scheduled sequence of actions includes actuating the valve to a first set point and, after a specified. period of time, actuating the valve to a second set point; and
    a scheduling module stored in the non-transitory computer readable memory, the scheduling module, when executed on the processor, configured to:
receive, at the field device, a time input, from the host via a wireless communication network, wherein the host is a portable communicator and wherein the time input specifies a scheduled time for performing i) a scheduled action or ii) a scheduled sequence of actions;
receive an action input, from the host, via the communication network, wherein the action input specifies i) the scheduled action or ii) the scheduled sequence of actions;
at the scheduled time and without further communication via the communication network, automatically causing the processor to execute the at least one function block to initiate i) the scheduled action or ii) the scheduled sequence of actions; and
perform at least one of: i) cause an initiation status to be sent to the host and ii) cause the initiation status to be stored in a local memory of the field device;
wherein the initiation status indicates that the action or the sequence of actions has been initiated.

21. A process control system according to claim 20, wherein the field device is further configured to perform at least one of: i) cause a completion status to be sent to the first host and ii) cause the completion status to be stored in the local memory.

22. A. process control system according to claim 21, wherein the completion status indicates that the action or the sequence of actions has been completed.

23. A process control system according to claim 21, wherein the completion status indicates one of: i) that the action or the sequence or actions has been completed successfully or ii) that the action or the sequence of actions has been completed unsuccessfully.

* * * * *